(12) United States Patent
Saito et al.

(10) Patent No.: US 10,718,929 B2
(45) Date of Patent: Jul. 21, 2020

(54) OPTICAL SYSTEM AND IMAGE PICKUP APPARATUS

(71) Applicant: CANON KABUSHIKI KAISHA, Tokyo (JP)

(72) Inventors: Shinichiro Saito, Utsunomiya (JP); Makoto Nakahara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 16/051,804

(22) Filed: Aug. 1, 2018

(65) Prior Publication Data

US 2019/0041606 A1 Feb. 7, 2019

(30) Foreign Application Priority Data

Aug. 7, 2017 (JP) .................. 2017-152259

(51) Int. Cl.
*G02B 15/14* (2006.01)
*G02B 9/14* (2006.01)
*G02B 15/28* (2006.01)
*G02B 27/00* (2006.01)
*H04N 5/225* (2006.01)

(52) U.S. Cl.
CPC .............. *G02B 9/14* (2013.01); *G02B 15/28* (2013.01); *G02B 27/0037* (2013.01); *H04N 5/2254* (2013.01)

(58) Field of Classification Search
CPC ...... G02B 9/14; G02B 15/28; G02B 27/0037; H04N 5/2254
USPC .................. 359/684, 716, 784, 785
See application file for complete search history.

(56) References Cited

U.S. PATENT DOCUMENTS 8,687,291 B2 * 4/2014 Eguchi ............... G02B 27/4211
359/745
9,219,864 B2 12/2015 Nakahara
9,377,606 B2 6/2016 Nakahara
(Continued)

FOREIGN PATENT DOCUMENTS

JP 2008203304 A 9/2008
JP 2012002999 A 1/2012
(Continued)

OTHER PUBLICATIONS

Japanese Office Action for application No. 2017152259 dated Jul. 2, 2019 with English translation.

*Primary Examiner* — William Choi
(74) *Attorney, Agent, or Firm* — Carter, DeLuca & Farrell LLP (57) ABSTRACT

Provided is an optical system including, in order from an object side to an image side: a first lens unit having a positive refractive power; a second lens unit having a negative refractive power configured to move during focusing; and a third lens unit, wherein an interval between each pair of adjacent lens units is changed during focusing, wherein the first lens unit includes a positive lens arranged closest to the object side and an aperture stop, wherein the second lens unit consists of one negative lens, and wherein a distance on an optical axis from a lens surface closest to the object side in the optical system to an image plane, a focal length of the optical system, a refractive index of a material of the one negative lens, and an Abbe number of the material of the one negative lens are appropriately set.

16 Claims, 6 Drawing Sheets

(56) References Cited

U.S. PATENT DOCUMENTS

| | | |
|---|---|---|
| 9,500,842 B2 | 11/2016 | Nakahara |
| 9,678,305 B2 * | 6/2017 | Sakai .................. G02B 9/62 |
| 2012/0229921 A1 | 9/2012 | Eguchi |
| 2014/0118603 A1 | 5/2014 | Saito |
| 2016/0341958 A1 | 11/2016 | Eguchi |
| 2017/0131620 A1 | 5/2017 | Nakahara |
| 2018/0164558 A1 | 6/2018 | Saito |
| 2019/0041605 A1 | 2/2019 | Saito et al. |

FOREIGN PATENT DOCUMENTS

| | | |
|---|---|---|
| JP | 2012189679 A | 10/2012 |
| JP | 2013092575 A | 5/2013 |
| JP | 2013097212 A | 5/2013 |
| JP | 2015163926 A | 9/2015 |
| JP | 2015215437 A | 12/2015 |
| JP | 2016218276 A | 12/2016 |

* cited by examiner

OPTICAL SYSTEM AND IMAGE PICKUP APPARATUS

BACKGROUND OF THE INVENTION

Field of the Invention

The present invention relates to an optical system and an image pickup apparatus, which are suitable as an image pickup optical system for a video camera, a digital still camera, a TV camera, or a monitoring camera, which uses an image pickup element, for example.

Description of the Related Art

As an optical system for use with an image pickup apparatus, for example, a digital camera or a video camera, an optical system of a telephoto type having a long focal length, a small F-number, and a large aperture is required. There is also required an optical system that enables easy and fast focusing and has high optical performance by satisfactorily correcting various aberrations, in particular, chromatic aberrations, which significantly affect the optical performance, for example.

In the related art, optical systems that satisfy the above-mentioned requirements are known. For example, there is known an optical system employing an inner focus system, which consists of, in order from an object side to an image side, a first lens unit having a positive refractive power, a second lens unit having a negative refractive power, and a third lens unit having a positive refractive power, and in which the second lens unit is configured to move during focusing (U.S. Patent Application Publication No. 2016/0341958).

There is also known an optical system employing an inner focus system, which consists of, in order from an object side to an image side, a first lens unit having a positive refractive power, a second lens unit having a positive or negative refractive power, and a third lens unit having a positive or negative refractive power, in which the second lens unit is configured to move during focusing (U.S. Patent Application Publication No. 2012/0229921).

The optical system of the telephoto type having the large aperture has a large lens effective diameter, and the entire lens system has a large size and a heavy weight. For example, when a mass of a focus lens unit is increased, a mechanical mechanism configured to drive the focus lens unit is increased in size, and hence the entire optical system is increased in size. In contrast, when an inner focus system in which focusing is performed with a lens unit after a first lens unit is employed, focusing can be performed with a lens unit having a relatively small size and light weight, and fast focusing is easily performed.

However, in general, as compared to a focus system in which the first lens unit or the entire optical system is configured to move, in the inner focus system, large variations in aberration are caused when the focus lens unit is moved, and it becomes difficult to satisfactorily perform aberration correction over the entire object distance.

Therefore, in order to obtain high optical performance over the entire object distance with the use of the inner focus system in an optical system of the telephoto type, it is important to appropriately set optical arrangement of lens units forming the optical system, and a refractive power and a lens configuration of each of the lens units, for example. In order to reduce variations in various aberrations, in particular, variations in chromatic aberrations during focusing, for example, selection of the lens unit during focusing and appropriate setting of a lens configuration become important.

SUMMARY OF THE INVENTION

According to one embodiment of the present invention, there is provided an optical system including, in order from an object side to an image side: a first lens unit having a positive refractive power; a second lens unit having a negative refractive power configured to move during focusing; and a third lens unit, wherein an interval between each pair of adjacent lens units is changed during focusing, wherein the first lens unit includes a positive lens G1P arranged closest to the object side, wherein the second lens unit consists of one negative lens G2N, and wherein the following conditional expressions are satisfied:

$LD/f<1.0$;

$1.58<ndG2N<1.80$; and $55<vdG2N<75$, where LD represents a distance on an optical axis from a lens surface closest to the object side in the optical system to an image plane, "f" represents a focal length of the optical system, ndG2N represents a refractive index of a material of the one negative lens G2N, and vdG2N represents an Abbe number of the material of the one negative lens G2N.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Now, exemplary embodiments of the present invention are described with reference to the accompanying drawings. An optical system according to one embodiment of the present invention includes, in order from an object side to an image side, a first lens unit having a positive refractive power, a second lens unit having a negative refractive power, and a third lens unit. The second lens unit is configured to move during focusing, and an interval between each pair of adjacent lens units is changed. A "lens unit" as used herein is lens elements that are configured to move integrally during focusing, and is only required to include one or more lenses, and is not required to include a plurality of lenses.

Figure 1A:
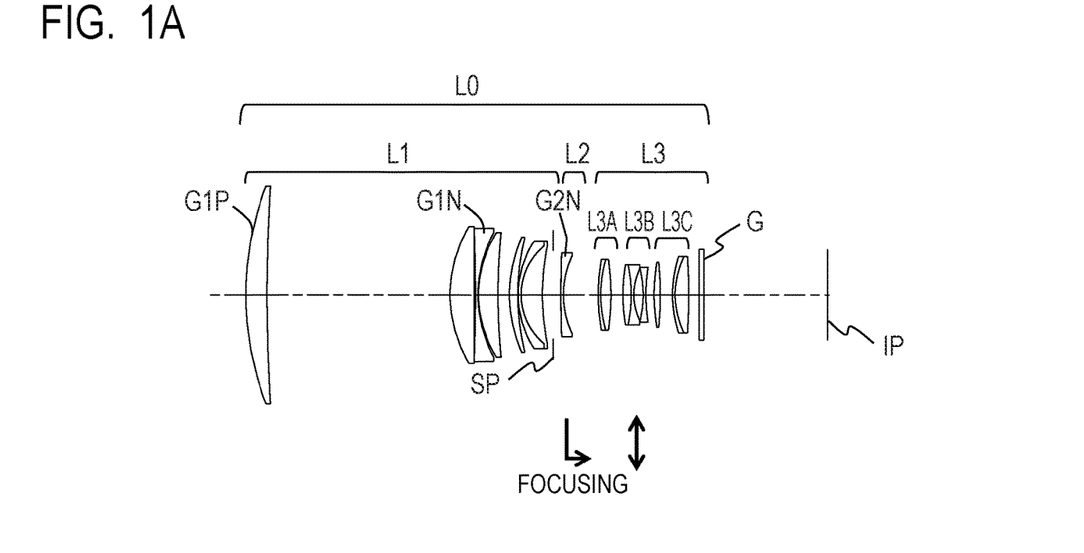
FIG. 1A is a cross-sectional view of an optical system according to Embodiment 1 of the present invention when focused at infinity.
Figure 1B:
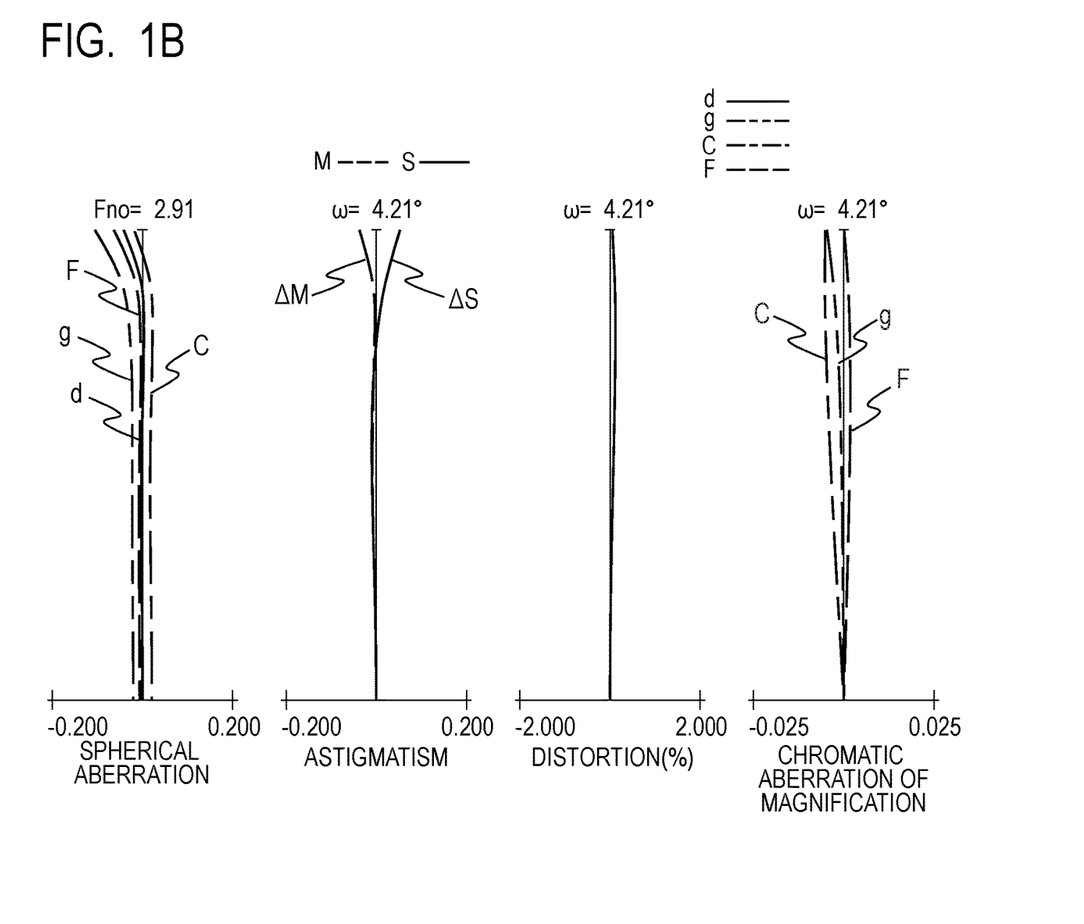
FIG. 1B is an aberration diagram of the optical system according to Embodiment 1 when focused at infinity.
Figure 2A:
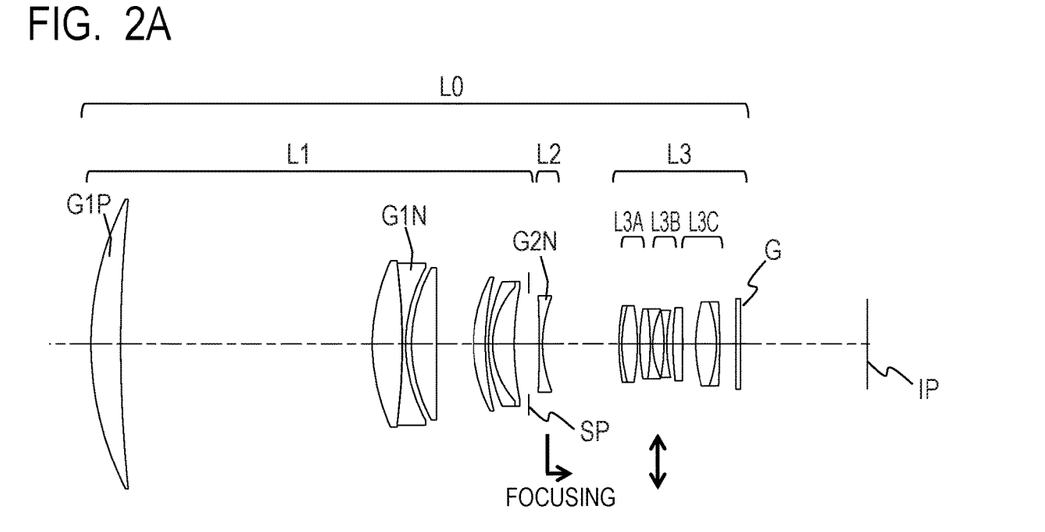
FIG. 2A is a cross-sectional view of an optical system according to Embodiment 2 of the present invention when focused at infinity.
Figure 2B:
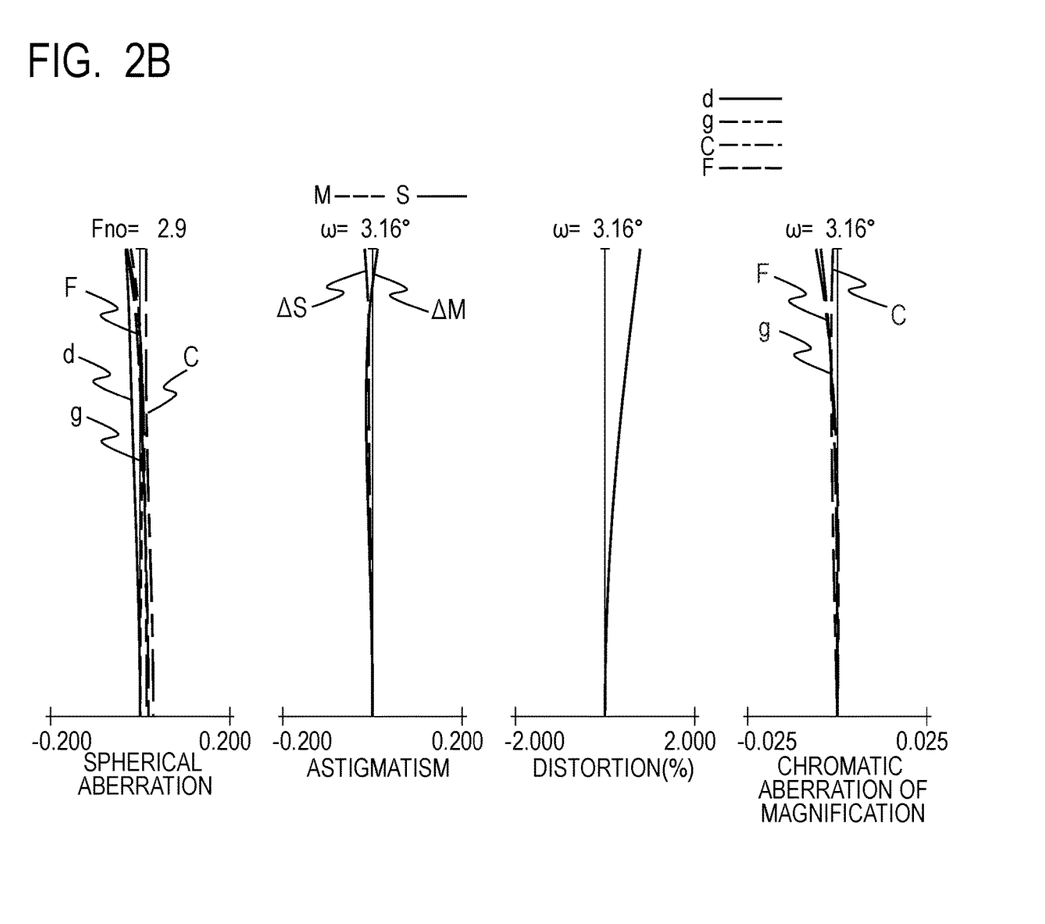
FIG. 2B is an aberration diagram of the optical system according to Embodiment 2 when focused at infinity.
Figure 3A:
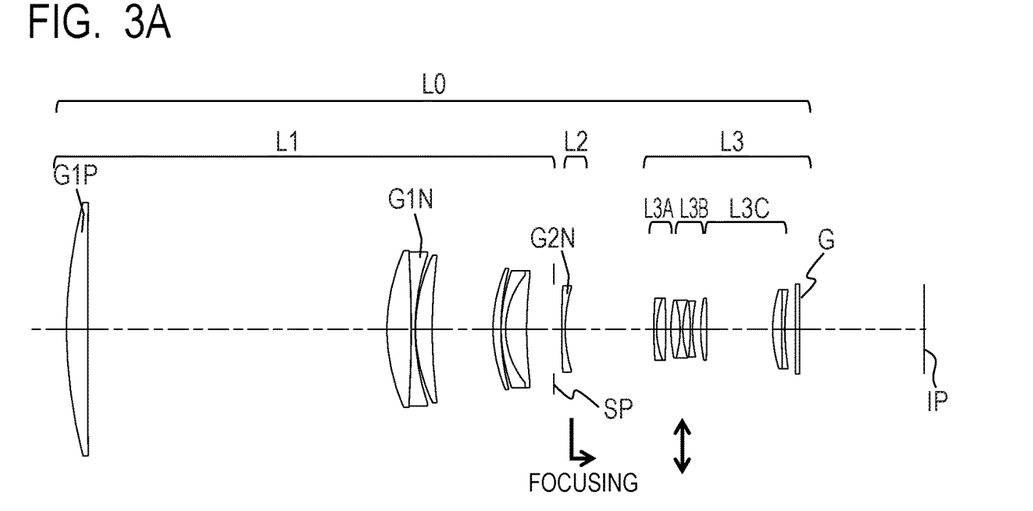
FIG. 3A is a cross-sectional view of an optical system according to Embodiment 3 of the present invention when focused at infinity.
Figure 3B:
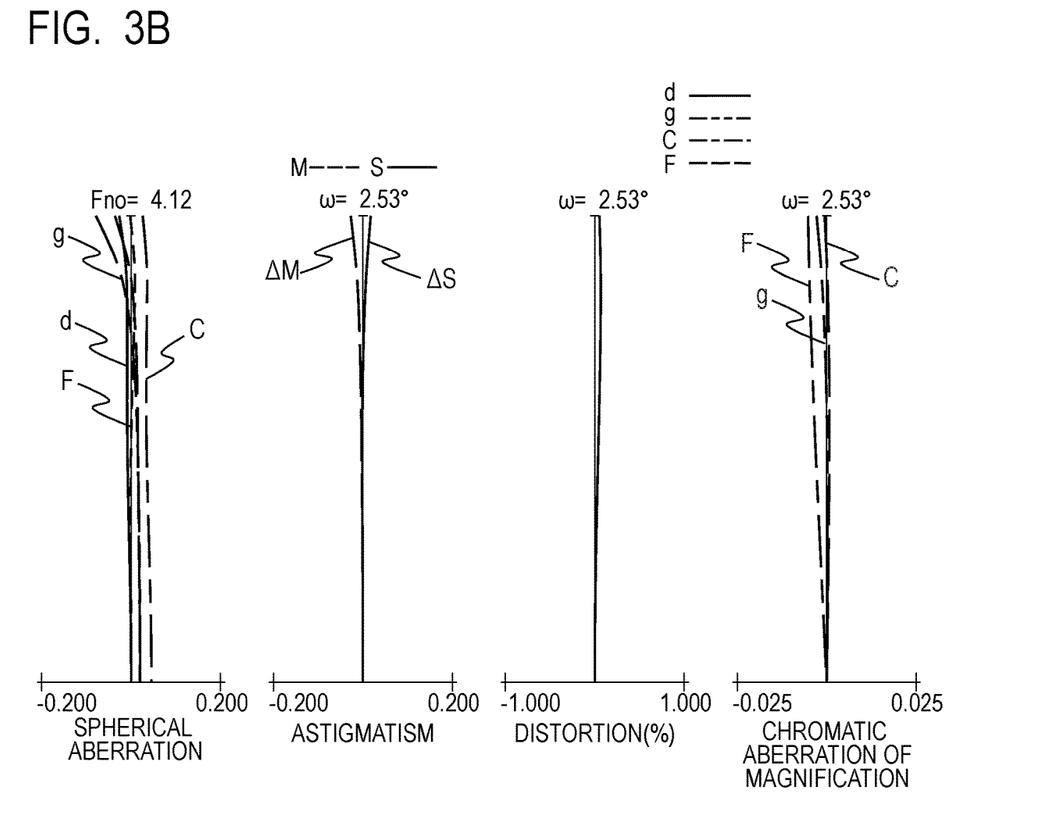
FIG. 3B is an aberration diagram of the optical system according to Embodiment 3 when focused at infinity.
Figure 4A:
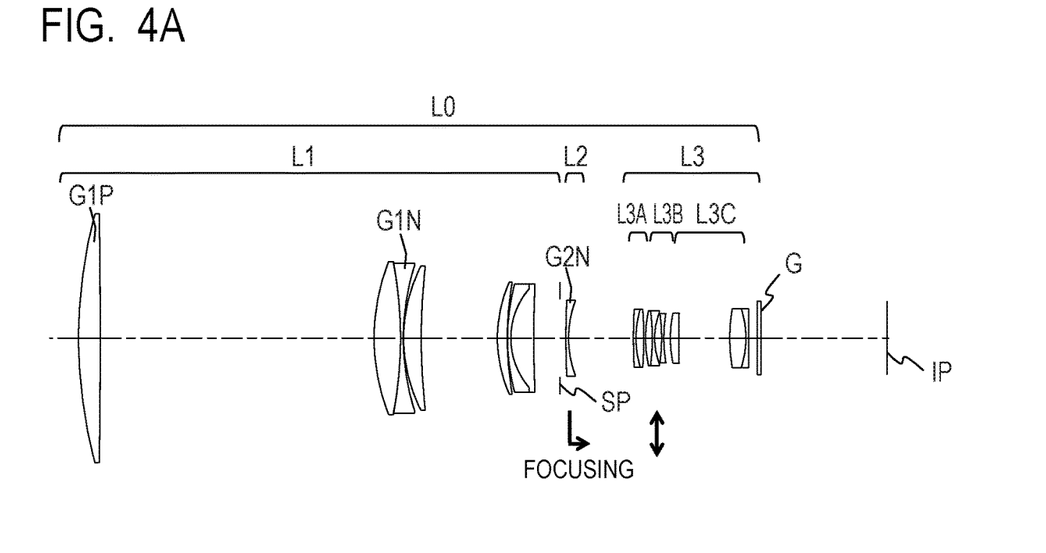
FIG. 4A is a cross-sectional view of an optical system according to Embodiment 4 of the present invention when focused at infinity.
Figure 4B:
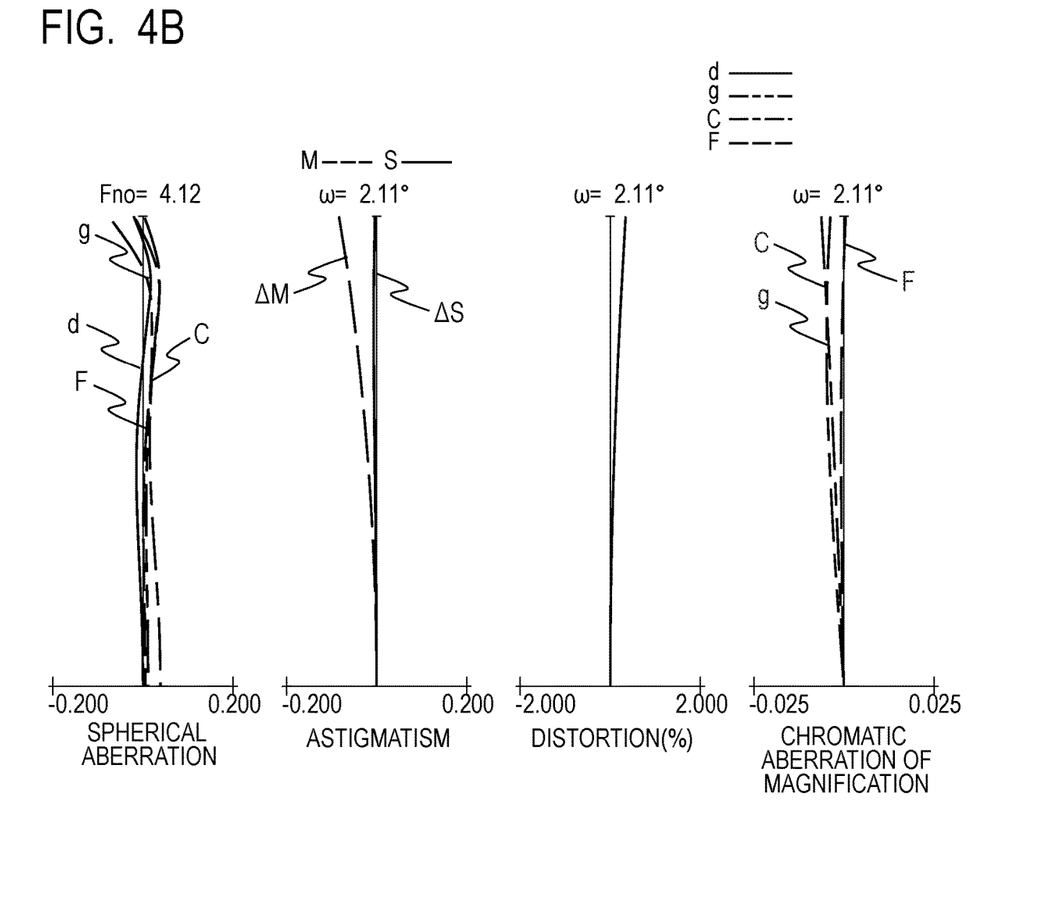
FIG. 4B is an aberration diagram of the optical system according to Embodiment 4 when focused at infinity.
Figure 5A:
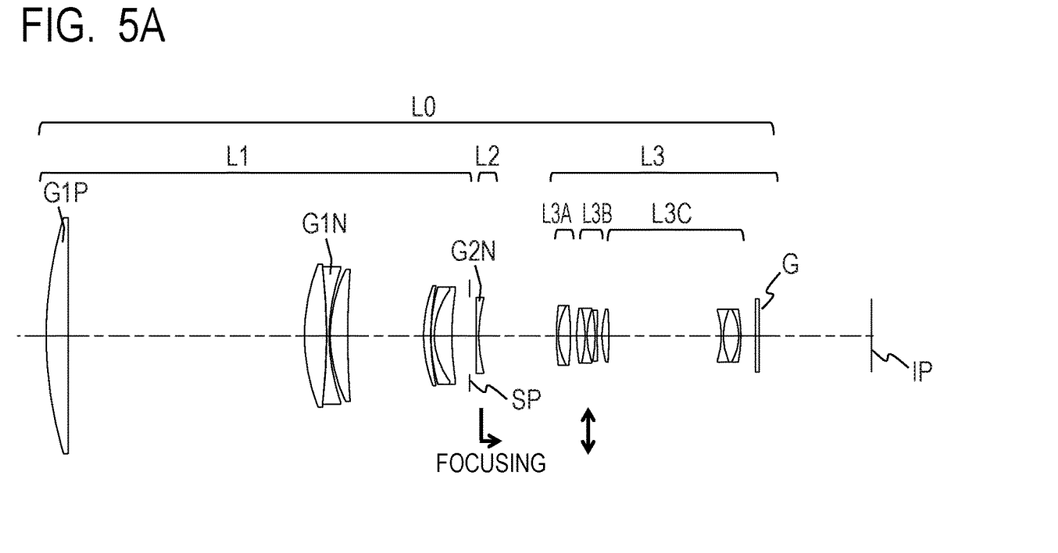
FIG. 5A is a cross-sectional view of an optical system according to Embodiment 5 of the present invention when focused at infinity.
Figure 5B:
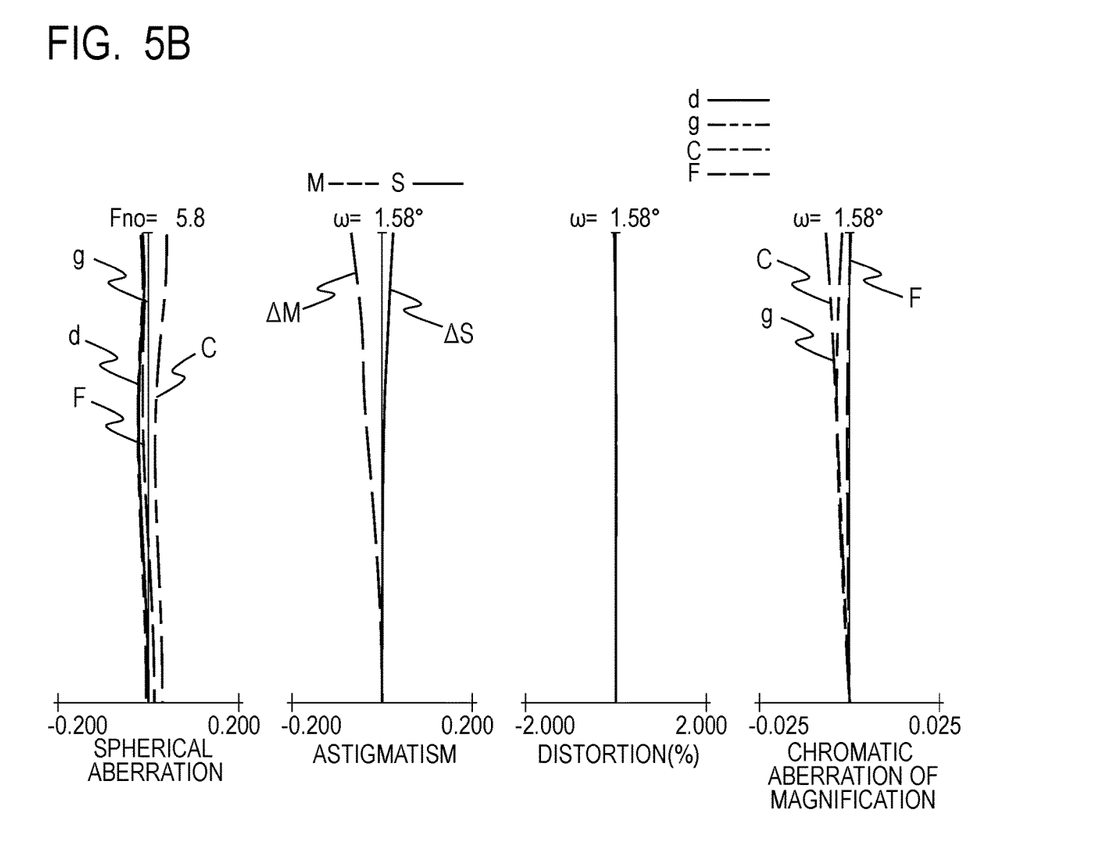
FIG. 5B is an aberration diagram of the optical system according to Embodiment 5 when focused at infinity.
Figure 6:
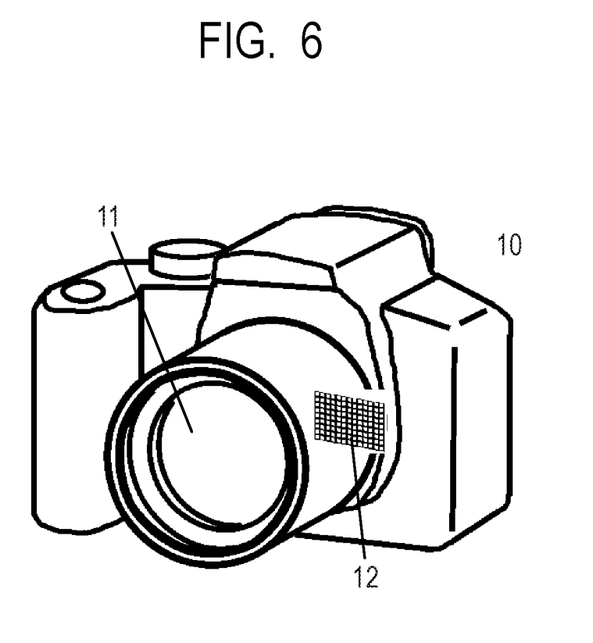
FIG. 6 is an explanatory view of an image pickup apparatus according to one embodiment of the present invention.

FIG. 1A, FIG. 2A, FIG. 3A, FIG. 4A, and FIG. 5A are lens cross-sectional views of optical systems according to Embodiments 1 to 5 of the present invention, respectively. FIG. 1B, FIG. 2B, FIG. 3B, FIG. 4B, and FIG. 5B are aberration diagrams of the optical systems according to Embodiments 1 to 5, respectively. FIG. 6 is a schematic view of a main part of a single lens reflex camera system (image pickup apparatus) including the optical system according to one embodiment of the present invention.

Embodiment 1 relates to an optical system of a telephoto type having an F-number of 2.9 and an image pickup half angle of view of 4.2°. Embodiment 2 relates to an optical system of a telephoto type having an F-number of 2.9 and an image pickup half angle of view of 3.2°. Embodiment 3 relates to an optical system of a telephoto type having an F-number of 4.1 and an image pickup half angle of view of 2.5°. Embodiment 4 relates to an optical system of a telephoto type having an F-number of 4.1 and an image pickup half angle of view of 2.1°. Embodiment 5 relates to an optical system of a telephoto type having an F-number of 5.8 and an image pickup half angle of view of 1.6°.

The optical system according to each of Embodiments is an image pickup optical system for use with an image pickup apparatus, for example, a video camera, a digital still camera, a monitoring camera, or a TV camera. The optical system according to each of Embodiments may also be used as a projection optical system for a projection apparatus (projector). In the lens cross-sectional views, the left side is an object side (front side), and the right side is an image side (rear side).

In the lens cross-sectional views, an optical system L0 includes a first lens unit L1 having a positive refractive power, a second lens unit L2 having a negative refractive power, and a third lens unit L3 having a positive or negative refractive power. The third lens unit L3 includes, in order from the object side to the image side, a first sub-lens unit L3A having a positive refractive power, which is configured not to move, a second sub-lens unit L3B having a negative refractive power for correction of image blurring, which is configured to move in a direction containing a component in a direction perpendicular to an optical axis during correction of image blurring, and a third sub-lens unit L3C, which is configured not to move.

An aperture stop SP, which is configured to determine (restrict) a light flux at an open F-number (Fno), is arranged between the first lens unit L1 and the second lens unit L2. A glass block, for example, an optical filter, is denoted by G. As an image plane IP, an image pickup surface of a solid-state image pickup element (photoelectric conversion element), for example, a CCD sensor or a CMOS sensor, is placed when in use as a photographing optical system of a video camera or a digital still camera. The arrow regarding focus indicates a movement direction of a lens unit during focusing from infinity to proximity.

Moreover, in the optical system according to each of Embodiments, some lenses of the third lens unit L3 are used as a sub-lens unit for image stabilization to correct image blurring. The correction of image blurring may be performed by any one of the first lens unit L1, the second lens unit L2, and the third lens unit L3. Further, some lenses included in a particular lens unit may be used as the sub-lens unit for image stabilization.

In the aberration diagrams, an F-number is represented by Fno. An image pickup half angle of view (degrees) is represented by "w", and is an angle of view calculated by paraxial calculation. In the spherical aberration diagrams, "d" indicates a d-line (wavelength: 587.56 nm), "g" indicates a g-line (wavelength: 435.835 nm), C indicates a C-line (wavelength: 656.27 nm), and F indicates an F-line (wavelength: 486.13 nm).

In the astigmatism diagrams, $\Delta S$ indicates a sagittal image plane with respect to the d-line, and $\Delta M$ indicates a meridional image plane with respect to the d-line. The distortion is depicted for the d-line. In the diagrams of chromatic aberration of magnification, "g" indicates a g-line, C indicates a C-line, and F indicates an F-line.

In many optical systems, as the total lens length (value obtained by adding an air-equivalent length of back focus to a distance from the first lens surface on the object side to the last lens surface) becomes shorter to downsize the entire optical system, an amount of various aberrations, in particular, chromatic aberrations such as axial chromatic aberration and chromatic aberration of magnification that occurs becomes larger. Moreover, optical performance is reduced.

In particular, in an optical system of a telephoto type in which the total lens length is reduced, as a focal length becomes longer, the amount of chromatic aberrations that occurs becomes larger. Moreover, as the focal length becomes longer, effective diameters of the first lens unit having the positive refractive power and the second lens unit having the negative refractive power become more likely to be increased in size. Therefore, in order to downsize the entire optical system, it is important to appropriately set lens configurations of the first lens unit and the second lens unit.

Further, in the optical system of the telephoto type, an effective diameter becomes larger as a lens becomes closer to the object side. Therefore, as the F-number becomes smaller, an effective diameter of a lens on the object side also becomes larger, and accordingly an outer diameter of the lens also becomes larger, with the result that a mass of the lens is increased in proportion to approximately the third power of the outer diameter. Therefore, in order to perform focusing with the second lens unit, and to downsize and reduce the weight of the second lens unit, it is very important to appropriately set the lens configuration of the second lens unit, and a refractive index, an Abbe number, a specific gravity, secondary dispersion, and the like of a material of a lens forming the second lens unit.

The optical system L0 according to one embodiment of the present invention includes, in order from the object side to the image side, the first lens unit L1 having the positive refractive power, the second lens unit L2 having the negative refractive power, which is configured to move during focusing, and the third lens unit L3. An interval between each pair of adjacent lens units is changed during focusing.

The second lens unit L2 consists of one negative lens G2N. A distance (total lens length obtained when parallel plates such as a filter are removed) on the optical axis from a lens surface closest to the object side in the optical system L0 to the image plane is represented by LD. A focal length of the optical system L0 is represented by "f". The first lens unit L1 includes a positive lens G1P closest to the object side, and a refractive index and an Abbe number of a material of the negative lens G2N are represented by ndG2N and vdG2N, respectively. Then, the following conditional expressions are satisfied:

$$LD/f<1.0 \quad (1);$$

$$1.58<ndG2N<1.80 \quad (2); \text{ and}$$

$$50<vdG2N<75 \quad (3).$$

When refractive indices with respect to the d-line, the F-line, the C-line, and the g-line of the Fraunhofer lines are represented by Nd, NF, NC, and Ng, respectively, an Abbe number "vd" and a partial dispersion ratio θgF of a material are defined as:

$$vd=(Nd-1)/(NF-NC); \text{ and}$$

$$\theta gF=(Ng-NF)/(NF-NC).$$

Now, technical meanings of the above-mentioned conditional expressions are described. The conditional expression (1) indicates that the total lens length LD is shorter than the focal length "f" of the entire optical system.

When the total lens length is to be reduced significantly, it becomes difficult to correct axial chromatic aberration and chromatic aberration of magnification in a balanced manner with only a front lens unit on the object side of the aperture stop SP. Therefore, it is required to correct chromatic aberrations also with rear lens units on the image side of the aperture stop SP, for example. When the upper limit of the conditional expression (1) is exceeded, aberration correction becomes easy, but the optical system is increased in size, with the result that a lens barrel configured to hold the optical system is increased in size.

The conditional expressions (2) and (3) define the refractive index with respect to the d-line and the Abbe number of the negative lens G2N forming the second lens unit L2, and is mainly intended to downsize and reduce the weight of the second lens unit L2 during focusing while reducing the total lens length.

When the upper limit of the conditional expression (2) is exceeded, it becomes easy to downsize the entire optical system. However, the refractive power becomes much higher, and when spherical aberration is corrected, a meniscus shape of the positive lens G1P becomes stronger, and it becomes difficult to correct off-axial comatic aberration. When the lower limit of the conditional expression (2) is exceeded, curvatures of lens surfaces become stronger in order to obtain a refractive power required of the negative lens G2N, and as a result, a variation in spherical aberration caused by focusing is increased.

When the upper limit of the conditional expression (3) is exceeded, it becomes easy to correct axial chromatic aberration. However, because of characteristics of the optical material, as the Abbe number becomes larger, the refractive index becomes smaller, with the result that it becomes difficult to correct spherical aberration and comatic aberration. When the lower limit of the conditional expression (3) is exceeded, and the Abbe number becomes smaller, it becomes difficult to correct axial chromatic aberration and chromatic aberration of magnification.

In each of Embodiments, as described above, each element is appropriately set so as to satisfy the conditional expressions (1) to (3). As a result, there is obtained an optical system having high optical performance, which is light-weight as the entire optical system, and in which various aberrations, such as chromatic aberrations, are satisfactorily corrected.

In each of Embodiments, it is further preferred to set the numerical value ranges of the conditional expressions (2) and (3) as follows.

$$1.585<ndG2N<1.700 \quad (2a)$$

$$55<vdG2N/72 \quad (3a)$$

It is further preferred to set the numerical value ranges of the conditional expressions (2a) and (3a) as follows.

$$1.59<ndG2N<1.65 \quad (2b)$$

$$58<vdG2N<70 \quad (3b)$$

The configuration of each of the lens units is appropriately set to satisfy the conditional expressions (1) to (3) as described above, to thereby obtain an optical system with which a wide angle of view and a large aperture ratio are realized, and which has high image forming performance in which chromatic aberrations are satisfactorily corrected. In each of Embodiments, it is further preferred to satisfy one or more of the conditional expressions provided below.

A partial dispersion ratio of the material of the negative lens G2N is represented by θgFG2N. A curvature radius of a lens surface on the object side of the negative lens G2N is represented by R1G2N, and a curvature radius of a lens surface on the image side of the negative lens G2N is represented by R2G2N. A focal length of the first lens unit L1 is represented by f1, and a focal length of the second lens unit L2 is represented by f2. The first lens unit L1 includes a plurality of negative lenses, and a distance on the optical axis between the positive lens G1P and a negative lens G1N, which is located closest to the object side of the negative lenses included in the first lens unit L1, is represented by dG1PN.

A distance on the optical axis from a vertex of the lens surface on the image side of the negative lens G2N to the image plane is represented by dF2. A Knoop hardness of the negative lens G2N is represented by HKG2N. A "Knoop hardness" as used herein is one of measures indicating a hardness of an industrial material, and one kind of indentation hardness. Moreover, a Knoop hardness HK is calculated by dividing a test force by a surface area of indentation and correction factor as follows:

$$HK=P/C_pL^2,$$

where:
$L^2$=surface area of indentation (unit: mm$^2$);
$C_p$=correction factor 0.070279; and
P=weight (unit: kgf).

In this case, it is preferred to satisfy one or more of the following conditional expressions.

$$0.534<\theta gFG2N<0.560 \quad (4)$$

$$-2.0<(R2G2N+R1G2N)/(R2G2N-R1G2N)<-0.5 \quad (5)$$

$$-2.8<f1/f2<-1.2 \quad (6)$$

$$0.17<dG1PN/f<0.45 \quad (7)$$

$$-0.5<f2/f<-0.1 \quad (8)$$

$$0.2<dF2/LD<0.5 \quad (9)$$

$$350<HKG2N<600 \quad (10)$$

Next, technical meanings of the above-mentioned conditional expressions are described. The conditional expression (4) defines the partial dispersion ratio of the material of the negative lens G2N, and is mainly intended to correct chromatic aberration of magnification, axial chromatic aberration, and other such various aberrations during focusing in a balanced manner.

When the upper limit of the conditional expression (4) is exceeded, axial chromatic aberration during focusing is varied, and a variation in spherical aberration for each wavelength is disadvantageously increased. When the lower limit of the conditional expression (4) is exceeded, the effect of correcting axial chromatic aberration by the negative lens G2N becomes weaker, and the necessity for increasing the converging action of the first lens unit L1 to reduce an incidence height of a ray that enters the second lens unit L2 becomes higher. Therefore, it is required to strengthen the positive refractive power of the first lens unit L1, and the number of lenses forming the first lens unit L1 is disadvantageously increased.

The conditional expression (5) defines a lens shape of the negative lens G2N, and is mainly intended to appropriately correct variations in spherical aberration and comatic aberration during focusing. When the upper limit of the conditional expression (5) is exceeded, a meniscus shape of the negative lens G2N becomes stronger, with the result that a large amount of spherical aberration disadvantageously occurs in a proximity range during focusing to a close distance object, and that it becomes difficult to manufacture the lens. When the lower limit of the conditional expression (5) is exceeded, a variation in distortion is increased during focusing.

The conditional expression (6) defines a ratio between the focal lengths of the first lens unit L1 and the second lens unit L2, and is mainly intended to appropriately correct a variation in spherical aberration during focusing.

When the upper limit of the conditional expression (6) is exceeded, the focal length of the first lens unit L1 becomes shorter, and the refractive power thereof becomes stronger, convergence of the light flux that enters the second lens unit becomes stronger. Thus, when the variation in various aberrations during focusing is to be reduced, it is required to strengthen the negative refractive power of the second lens unit L2, and sensitivity of spherical aberration to a manufacturing error becomes disadvantageously higher. When the lower limit of the conditional expression (6) is exceeded, and the negative refractive power of the second lens unit L2 becomes stronger, it becomes easy to reduce the total lens length, but a variation in axial chromatic aberration caused by focusing is disadvantageously increased.

The conditional expression (7) defines a ratio of the distance dG1PN on the optical axis between the positive lens G1P, which is located closest to the object side, and the negative lens G1N with respect to the focal length "f" of the entire lens system.

When the upper limit of the conditional expression (7) is exceeded, and the distance dG1PN becomes longer, an incidence height of an axial ray that enters the negative lens G1N becomes lower, with the result that it becomes easy to downsize and reduce the weight of the second lens unit L2 during focusing, but that it becomes disadvantageously difficult to secure predetermined sensitivity. When the lower limit value of the conditional expression (7) is exceeded, and the distance dG1PN becomes shorter, the distance between the positive lens G1P and the negative lens G1N becomes much shorter, an effective diameter of the negative lens G1N becomes larger, and a mass of the negative lens G1N is disadvantageously increased.

The conditional expression (8) defines a ratio of the focal length f2 of the second lens unit L2 to the focal length "f" of the entire optical system. When the upper limit of the conditional expression (8) is exceeded, and the negative focal length f2 of the second lens unit L2 becomes shorter, the negative refractive power of the second lens unit L2 becomes much stronger, and variations in various aberrations, such as axial chromatic aberration and spherical aberration, are increased during focusing. When the lower limit of the conditional expression (8) is exceeded, and the negative focal length f2 of the second lens unit L2 becomes longer, the negative refractive power of the second lens unit L2 becomes weaker, with the result that a movement amount of the second lens unit L2 during focusing is increased, and that the total lens length is increased.

The conditional expression (9) defines a position on the optical axis of the second lens unit L2 with respect to the total lens length, and is mainly intended to reduce the variations in aberrations caused by focusing, and to downsize and reduce the weight of the second lens unit. When the upper limit of the conditional expression (9) is exceeded, and the distance dF2 becomes longer, the incidence height of the ray that enters the second lens unit L2 becomes higher, and a variation in spherical aberration caused by focusing becomes larger. Moreover, deterioration in comatic aberration caused by decentering becomes disadvantageously significant. When the lower limit value of the conditional expression (9) is exceeded, and the distance dF2 becomes shorter, it becomes difficult to secure predetermined positional sensitivity, and the movement amount of the second lens unit L2 during focusing is increased.

The conditional expression (10) defines the Knoop hardness HKG2N of the material of the positive lens G2N. The Knoop hardness HKG2N is preferably from about 350 to about 600. When the Knoop hardness HKG2N satisfies such a value, chemical resistance of an optical component is further increased. Moreover, it becomes easy to polish the optical component so as not to deteriorate a surface thereof.

It is further preferred to set the numerical value ranges of the conditional expressions (4) to (10) as follows.

$$0.534 < \theta gFG2N < 0.550 \tag{4a}$$

$$-1.6 < (R2G2N+R1G2N)/(R2G2N-R1G2N) < -0.6 \tag{5a}$$

$$-2.5 < f1/f2 < -1.5 \tag{6a}$$

$$0.18 < dG1PN/f < 0.40 \tag{7a}$$

$$-0.40 < f2/f < -0.15 \tag{8a}$$

$$0.24 < dF2/LD < 0.49 \tag{9a}$$

$$380 < HKG2N < 590 \tag{10a}$$

It is further preferred to set the numerical value ranges of the conditional expressions (4a) to (10a) as follows.

$$0.535 < \theta gFG2N < 0.545 \tag{4b}$$

$$-1.4 < (R2G2N+R1G2N)/(R2G2N-R1G2N) < -0.7 \tag{5b}$$

$$-2.3 < f1/f2 < -1.6 \tag{6b}$$

$$0.19 < dG1PN/f < 0.36 \tag{7b}$$

$$-0.28 < f2/f < -0.17 \tag{8b}$$

$0.26 < dF2/LD < 0.48$ (9b)

$385 < HKG2N < 580$ (10b)

It is preferred for the optical system according to each of Embodiments to include the aperture stop SP arranged on the object side of the second lens unit L2 to be adjacent to the second lens unit L2. In other words, it is preferred for the first lens unit L1 to include the aperture stop SP, which is arranged closest to the image side in the first lens unit L1.

It is preferred that the third lens unit L3 consist of, in order from the object side to the image side, the first sub-lens unit L3A having the positive refractive power, the second sub-lens unit L3B having the negative refractive power, and the third sub-lens unit L3C. Further, it is desired that the second sub-lens unit L3B be configured to move in the direction containing the component in the direction perpendicular to the optical axis to perform correction of image blurring. With this configuration, it becomes easy to reduce a diameter of a sub-lens unit for correction of image blurring.

It is preferred that the third lens unit L3 include a cemented lens formed by cementing a negative lens and a positive lens closest to the object side. With this configuration, it becomes easy to correct off-axial comatic aberration and correct spherical aberration.

Next, a digital still camera (image pickup apparatus) according to one embodiment of the present invention, which uses the optical system according to one embodiment of the present invention as an image pickup optical system, is described with reference to FIG. 6. In FIG. 6, a camera main body 10, and an image pickup optical system 11 consisting of the optical system described in one of Embodiments 1 to 5 are illustrated. An image pickup element (photo-electric conversion element) 12, for example, a CCD sensor or a CMOS sensor, is included in the camera main body, and is configured to receive an object image formed by the image pickup optical system 11.

Numerical Data corresponding to Embodiments 1 to 5 of the present invention is described below. In each set of Numerical Data, the order of a surface from the object side is represented by "i", a curvature radius of the i-th surface from the object side is represented by "ri", an interval between the i-th surface and the (i+1)-th surface from the object side is represented by "di", and a refractive index and an Abbe number of an optical member between the i-th surface and the (i+1)-th surface are represented by "ndi" and "vdi", respectively. The focal length, the F-number, and a half angle of view (degrees) of the entire optical system when focused on an object at infinity are shown. The air-equivalent value (distance obtained when parallel plates such as a filter are removed) of back focus is represented by BF.

In each set of Numerical Data, two surfaces closest to the image side correspond to a glass block, for example, a filter. Relationships between the conditional expressions described above and various numerical values in Embodiments are shown in Table 1.

[Numerical Data 1]

Unit: mm

Surface data

| Surface number | r | d | nd | vd | θgF |
|---|---|---|---|---|---|
| 1 | 142.636 | 10.36 | 1.61800 | 63.40 | 0.5395 |
| 2 | 803.414 | 87.02 | | | |
| 3 | 64.050 | 11.52 | 1.43387 | 95.10 | 0.5373 |
| 4 | −4,275.797 | 0.53 | | | |
| 5 | −789.539 | 1.20 | 1.80610 | 33.27 | 0.5881 |
| 6 | 61.251 | 0.25 | | | |
| 7 | 55.129 | 9.48 | 1.43387 | 95.10 | 0.5373 |
| 8 | 293.161 | 5.47 | | | |
| 9 | 67.158 | 3.97 | 1.89286 | 20.36 | 0.6393 |
| 10 | 114.029 | 0.15 | | | |
| 11 | 47.312 | 1.40 | 1.83481 | 42.74 | 0.5648 |
| 12 | 30.444 | 10.09 | 1.43875 | 94.66 | 0.5340 |
| 13 | 113.939 | 5.13 | | | |
| 14 (Stop) | ∞ | 3.69 | | | |
| 15 | 567.430 | 1.20 | 1.60300 | 65.44 | 0.5401 |
| 16 | 43.779 | 16.52 | | | |
| 17 | 93.335 | 1.20 | 1.89286 | 20.36 | 0.6393 |
| 18 | 58.681 | 4.90 | 1.49700 | 81.54 | 0.5375 |
| 19 | −115.284 | 5.67 | | | |
| 20 | 80.365 | 4.02 | 1.85025 | 30.05 | 0.5979 |
| 21 | −65.106 | 1.20 | 1.62299 | 58.16 | 0.5458 |
| 22 | 28.801 | 4.48 | | | |
| 23 | −49.796 | 1.20 | 1.77250 | 49.60 | 0.5520 |
| 24 | 83.318 | 3.95 | | | |
| 25 | 94.977 | 2.93 | 1.69895 | 30.13 | 0.6030 |
| 26 | −154.696 | 5.82 | | | |
| 27 | 59.250 | 1.20 | 1.94595 | 17.98 | 0.6544 |
| 28 | 40.611 | 6.51 | 1.66565 | 35.64 | 0.5824 |
| 29 | −262.154 | 4.96 | | | |
| 30 | ∞ | 2.20 | 1.51633 | 64.14 | 0.5353 |
| 31 | ∞ | 58.94 | | | |
| Image plane | ∞ | | | | |

Various data

| Focal length | 294.00 |
|---|---|
| F-number | 2.91 |
| Half angle of view (degrees) | 4.21 |
| Image height | 21.64 |
| Total lens length | 276.40 |
| BF | 65.35 |

Lens unit data

| Unit | First surface | Focal length |
|---|---|---|
| 1 | 1 | 132.30 |
| 2 | 15 | −78.74 |
| 3 | 17 | 341.78 |

[Numerical Data 2]

Unit: mm

Surface data

| Surface number | r | d | nd | vd | θgF |
|---|---|---|---|---|---|
| 1 | 154.557 | 14.23 | 1.59522 | 67.74 | 0.5442 |
| 2 | 679.875 | 120.54 | | | |
| 3 | 94.858 | 14.30 | 1.43700 | 95.10 | 0.5326 |
| 4 | −305.077 | 0.17 | | | |
| 5 | −287.520 | 1.50 | 1.80610 | 33.27 | 0.5881 |
| 6 | 74.517 | 2.79 | | | |
| 7 | 74.499 | 11.84 | 1.43700 | 95.10 | 0.5326 |
| 8 | ∞ | 17.88 | | | |
| 9 | 67.131 | 5.78 | 1.89286 | 20.36 | 0.6393 |
| 10 | 126.369 | 1.51 | | | |
| 11 | 70.332 | 2.00 | 1.83400 | 37.16 | 0.5776 |
| 12 | 40.254 | 10.32 | 1.43700 | 95.10 | 0.5326 |
| 13 | 136.354 | 6.96 | | | |
| 14 (Stop) | ∞ | 5.00 | | | |
| 15 | −565.896 | 1.60 | 1.61800 | 63.40 | 0.5395 |
| 16 | 60.047 | 36.49 | | | |
| 17 | 100.609 | 1.40 | 1.89286 | 20.36 | 0.6393 |

-continued

Unit: mm

| | | | | | |
|---|---|---|---|---|---|
| 18 | 65.898 | 7.56 | 1.51742 | 52.43 | 0.5564 |
| 19 | −93.940 | 1.00 | | | |
| 20 | 93.498 | 5.02 | 1.80610 | 33.27 | 0.5881 |
| 21 | −121.171 | 1.20 | 1.53775 | 74.70 | 0.5392 |
| 22 | 36.544 | 5.43 | | | |
| 23 | −82.448 | 1.20 | 1.72916 | 54.68 | 0.5444 |
| 24 | 68.589 | 3.01 | | | |
| 25 | 137.981 | 4.68 | 1.65412 | 39.68 | 0.5737 |
| 26 | −1,080.069 | 6.25 | | | |
| 27 | 71.025 | 10.18 | 1.72047 | 34.71 | 0.5834 |
| 28 | −58.624 | 1.50 | 1.80810 | 22.76 | 0.6307 |
| 29 | −358.198 | 7.77 | | | |
| 30 | ∞ | 2.20 | 1.51633 | 64.14 | 0.5353 |
| 31 | ∞ | 60.70 | | | |
| Image plane | ∞ | | | | |

Various data

| | |
|---|---|
| Focal length | 392.00 |
| F-number | 2.90 |
| Half angle of view (degrees) | 3.16 |
| Image height | 21.64 |
| Total lens length | 371.25 |
| BF | 69.92 |

Lens unit data

| Unit | First surface | Focal length |
|---|---|---|
| 1 | 1 | 187.63 |
| 2 | 15 | −87.76 |
| 3 | 17 | 246.94 |

[Numerical Data 3]

Unit: mm

Surface data

| Surface number | r | d | nd | νd | θgF |
|---|---|---|---|---|---|
| 1 | 239.937 | 10.05 | 1.59349 | 67.00 | 0.5361 |
| 2 | 7,608.704 | 143.66 | | | |
| 3 | 92.480 | 11.58 | 1.43387 | 95.10 | 0.5373 |
| 4 | −608.676 | 0.07 | | | |
| 5 | −572.992 | 1.85 | 1.80610 | 33.27 | 0.5881 |
| 6 | 110.750 | 0.15 | | | |
| 7 | 80.486 | 7.96 | 1.43387 | 95.10 | 0.5373 |
| 8 | 268.516 | 29.41 | | | |
| 9 | 74.048 | 3.77 | 1.92286 | 18.90 | 0.6495 |
| 10 | 114.076 | 0.15 | | | |
| 11 | 81.966 | 2.10 | 1.83481 | 42.74 | 0.5648 |
| 12 | 40.684 | 10.10 | 1.43700 | 95.10 | 0.5326 |
| 13 | 211.722 | 13.05 | | | |
| 14 (Stop) | ∞ | 3.76 | | | |
| 15 | 454.394 | 1.60 | 1.59522 | 67.74 | 0.5442 |
| 16 | 67.563 | 42.53 | | | |
| 17 | 250.115 | 1.30 | 1.89286 | 20.36 | 0.6393 |
| 18 | 41.548 | 4.42 | 1.80610 | 33.27 | 0.5881 |
| 19 | −259.897 | 2.39 | | | |
| 20 | 69.730 | 4.44 | 1.66680 | 33.05 | 0.5957 |
| 21 | −54.212 | 1.30 | 1.59522 | 67.74 | 0.5442 |
| 22 | 42.897 | 3.59 | | | |
| 23 | −112.462 | 1.10 | 1.77250 | 49.60 | 0.5520 |
| 24 | 66.134 | 4.10 | | | |
| 25 | 75.201 | 2.95 | 1.76182 | 26.52 | 0.6136 |
| 26 | −469.229 | 31.57 | | | |
| 27 | 64.591 | 4.29 | 1.66565 | 35.64 | 0.5824 |
| 28 | 519.783 | 1.50 | 1.92286 | 20.88 | 0.6391 |
| 29 | 117.158 | 4.99 | | | |
| 30 | ∞ | 2.20 | 1.51633 | 64.14 | 0.5353 |
| 31 | ∞ | 59.59 | | | |
| Image plane | ∞ | | | | |

-continued

Unit: mm

Various data

| | |
|---|---|
| Focal length | 490.00 |
| F-number | 4.12 |
| Half angle of view (degrees) | 2.53 |
| Image height | 21.64 |
| Total lens length | 410.77 |
| BF | 66.03 |

Lens unit data

| Unit | First surface | Focal length |
|---|---|---|
| 1 | 1 | 215.15 |
| 2 | 15 | −133.54 |
| 3 | 17 | 7,321.08 |

[Numerical Data 4]

Unit: mm

Surface data

| Surface number | r | d | nd | νd | θgF |
|---|---|---|---|---|---|
| 1 | 285.176 | 12.69 | 1.59349 | 67.00 | 0.5361 |
| 2 | −4,767.657 | 161.04 | | | |
| 3 | 122.017 | 15.58 | 1.43387 | 95.10 | 0.5373 |
| 4 | −233.175 | 0.00 | | | |
| 5 | −238.384 | 1.60 | 1.80610 | 33.27 | 0.5881 |
| 6 | 141.021 | 0.15 | | | |
| 7 | 93.182 | 10.34 | 1.43387 | 95.10 | 0.5373 |
| 8 | 377.979 | 45.03 | | | |
| 9 | 80.811 | 5.76 | 1.84666 | 23.88 | 0.6218 |
| 10 | 182.524 | 0.15 | | | |
| 11 | 120.397 | 2.00 | 1.80420 | 46.50 | 0.5572 |
| 12 | 44.703 | 13.45 | 1.43700 | 95.10 | 0.5326 |
| 13 | 642.625 | 15.35 | | | |
| 14 (Stop) | ∞ | 3.49 | | | |
| 15 | 491.750 | 1.60 | 1.59349 | 67.00 | 0.5361 |
| 16 | 62.367 | 38.06 | | | |
| 17 | 325.083 | 1.50 | 1.89286 | 20.36 | 0.6393 |
| 18 | 59.275 | 4.64 | 1.73800 | 32.26 | 0.5899 |
| 19 | −214.466 | 1.00 | | | |
| 20 | 74.220 | 4.00 | 1.80518 | 25.46 | 0.6156 |
| 21 | −119.987 | 1.30 | 1.59349 | 67.00 | 0.5361 |
| 22 | 41.290 | 4.13 | | | |
| 23 | −102.097 | 1.30 | 1.81600 | 46.62 | 0.5568 |
| 24 | 85.886 | 3.79 | | | |
| 25 | 68.860 | 5.13 | 1.85478 | 24.80 | 0.6122 |
| 26 | 2,687.062 | 30.08 | | | |
| 27 | 99.601 | 9.53 | 1.66565 | 35.64 | 0.5824 |
| 28 | −56.296 | 1.50 | 1.89286 | 20.36 | 0.6393 |
| 29 | 979.304 | 5.25 | | | |
| 30 | ∞ | 2.20 | 1.51633 | 64.14 | 0.5353 |
| 31 | ∞ | 73.90 | | | |
| Image plane | ∞ | | | | |

Various data

| | |
|---|---|
| Focal length | 588.00 |
| F-number | 4.12 |
| Half angle of view (degrees) | 2.11 |
| Image height | 21.64 |
| Total lens length | 474.78 |
| BF | 80.59 |

-continued

Unit: mm

Lens unit data

| Unit | First surface | Focal length |
|---|---|---|
| 1 | 1 | 237.94 |
| 2 | 15 | −120.51 |
| 3 | 17 | −47,873.47 |

[Numerical Data 5]

Unit: mm

Surface data

| Surface number | r | d | nd | vd | θgF |
|---|---|---|---|---|---|
| 1 | 240.726 | 12.89 | 1.61800 | 63.40 | 0.5395 |
| 2 | ∞ | 138.98 | | | |
| 3 | 114.535 | 12.87 | 1.43387 | 95.10 | 0.5373 |
| 4 | −359.087 | 0.18 | | | |
| 5 | −332.929 | 1.50 | 1.80610 | 33.27 | 0.5881 |
| 6 | 117.700 | 0.64 | | | |
| 7 | 87.931 | 10.17 | 1.43387 | 95.10 | 0.5373 |
| 8 | 505.314 | 44.59 | | | |
| 9 | 82.410 | 4.12 | 1.89286 | 20.36 | 0.6393 |
| 10 | 139.657 | 0.15 | | | |
| 11 | 102.973 | 2.00 | 1.77250 | 49.60 | 0.5520 |
| 12 | 44.474 | 10.25 | 1.43387 | 95.10 | 0.5373 |
| 13 | 164.169 | 10.67 | | | |
| 14 (Stop) | ∞ | 3.94 | | | |
| 15 | 2,771.562 | 1.50 | 1.60311 | 60.64 | 0.5415 |
| 16 | 81.493 | 45.55 | | | |
| 17 | 135.371 | 1.20 | 1.89286 | 20.36 | 0.6393 |
| 18 | 36.458 | 7.13 | 1.63980 | 34.46 | 0.5922 |
| 19 | −142.839 | 3.59 | | | |
| 20 | 92.151 | 4.92 | 1.76182 | 26.52 | 0.6136 |
| 21 | −64.477 | 1.20 | 1.72916 | 54.68 | 0.5444 |
| 22 | 44.366 | 4.67 | | | |
| 23 | −78.668 | 1.20 | 1.76385 | 48.51 | 0.5587 |
| 24 | 401.999 | 2.82 | | | |
| 25 | 54.724 | 4.09 | 1.67270 | 32.10 | 0.5988 |
| 26 | −248.815 | 66.28 | | | |
| 27 | −46.725 | 1.20 | 1.43875 | 94.66 | 0.5340 |
| 28 | 39.037 | 8.98 | 1.59551 | 39.24 | 0.5803 |
| 29 | −31.547 | 1.30 | 1.92286 | 20.88 | 0.6391 |
| 30 | −78.510 | 8.46 | | | |
| 31 | ∞ | 2.20 | 1.51633 | 64.14 | 0.5353 |
| 32 | ∞ | 66.02 | | | |
| Image plane | ∞ | | | | |

Various data

| Focal length | 784.00 |
|---|---|
| F-number | 5.80 |
| Half angle of view (degrees) | 1.58 |
| Image height | 21.64 |
| Total lens length | 484.53 |
| BF | 75.94 |

Lens unit data

| Unit | First surface | Focal length |
|---|---|---|
| 1 | 1 | 269.42 |
| 2 | 15 | −139.24 |
| 3 | 17 | −439.91 |

TABLE 1

| Parameter | Embodiment 1 | Embodiment 2 | Embodiment 3 | Embodiment 4 | Embodiment 5 |
|---|---|---|---|---|---|
| f | 294.000 | 392.000 | 490.000 | 588.000 | 784.000 |
| f1 | 132.302 | 187.630 | 215.151 | 237.938 | 269.417 |
| f2 | −78.739 | −87.757 | −133.542 | −120.515 | −139.243 |
| f3 | 341.776 | 246.994 | 7,321.078 | −47,873.465 | −439.908 |
| f3A | 140.732 | 116.302 | 218.844 | 279.954 | 240.963 |
| f3B | −31.459 | −43.946 | −48.307 | −54.464 | −52.975 |
| f3C | 44.747 | 63.938 | 71.563 | 73.441 | 68.134 |
| sk | 65.35 | 69.92 | 66.03 | 80.60 | 75.93 |
| R1G2N | 567.430 | −565.896 | 454.394 | 491.750 | 2,771.562 |
| R2G2N | 43.779 | 60.047 | 67.563 | 62.367 | 81.493 |
| dG1PN | 99.069 | 135.006 | 155.308 | 176.614 | 152.034 |
| dF2 | 125.697 | 155.593 | 172.259 | 187.294 | 230.808 |
| Total lens length LD | 276.40 | 371.25 | 410.77 | 474.78 | 484.53 |
| Conditional Expression | | | | | |
| (1) LD/f | 0.940 | 0.947 | 0.838 | 0.807 | 0.618 |
| (2) ndG2N | 1.60300 | 1.61800 | 1.59522 | 1.59349 | 1.60311 |
| (3) vdG2N | 65.44 | 63.40 | 67.74 | 67.00 | 60.64 |
| (4) θgFG2N | 0.5401 | 0.5395 | 0.544 | 0.536 | 0.542 |
| (5) (R2G2N + R1G2N)/(R2G2N − R1G2N) | −1.167 | −0.808 | −1.349 | −1.290 | −1.061 |
| (6) f1/f2 | −1.680 | −2.138 | −1.611 | −1.974 | −1.935 |
| (7) dG1PN/f | 0.337 | 0.344 | 0.317 | 0.300 | 0.194 |
| (8) f2/f | −0.268 | −0.224 | −0.273 | −0.205 | −0.178 |
| (9) dF2/LD | 0.455 | 0.419 | 0.419 | 0.394 | 0.476 |
| (10) HKG2N | 390 | 445 | 390 | 440 | 570 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-152259, filed Aug. 7, 2017, which is hereby incorporated by reference herein in its entirety.

What is claimed is:

1. An optical system comprising, in order from an object side to an image side:
   a first lens unit having a positive refractive power;
   a second lens unit having a negative refractive power configured to move during focusing; and
   a third lens unit,
   wherein an interval between each pair of adjacent lens units is changed during focusing,
   wherein the first lens unit comprises a positive lens arranged closest to the object side and an aperture stop,
   wherein the second lens unit consists of one negative lens, and
   wherein the following conditional expressions are satisfied:

$LD/f<1.0;$ $1.58<ndG2N<1.80;$ $55<vdG2N<75;$ and $0.534<\theta gFG2N<0.560,$ where LD represents a distance on an optical axis from a lens surface closest to the object side in the optical system to an image plane, f represents a focal length of the optical system, ndG2N represents a refractive index of a material of the one negative lens, vdG2N represents an Abbe number of the material of the one negative lens, and $\theta gFG2N$ represents a partial dispersion ratio of the material of the one negative lens.

2. The optical system according to claim 1, wherein the following conditional expression is satisfied:

$-2.0<(R2G2N+R1G2N)/(R2G2N-R1G2N)<-0.5,$ where R1G2N represents a curvature radius of a lens surface on the object side of the one negative lens, and R2G2N represents a curvature radius of a lens surface on the image side of the one negative lens.

3. The optical system according to claim 1, wherein the following conditional expression is satisfied:

$-2.8<f1/f2<-1.2,$ where f1 represents a focal length of the first lens unit, and f2 represents a focal length of the second lens unit.

4. The optical system according to claim 1,
   wherein the first lens unit comprises a plurality of negative lenses, and
   wherein the following conditional expression is satisfied:

$0.17<dG1PN/f<0.45,$ where dG1PN represents a distance on the optical axis between the positive lens and a negative lens located closest to the object side of the plurality of negative lenses included in the first lens unit.

5. The optical system according to claim 1, wherein the following conditional expression is satisfied:

$-0.5<f2/f<-0.1,$ where f2 represents a focal length of the second lens unit.

6. The optical system according to claim 1, wherein the following conditional expression is satisfied:

$0.2<dF2/LD<0.5,$ where dF2 represents a distance on the optical axis from a lens surface on the image side of the one negative lens to the image plane.

7. The optical system according to claim 1, wherein the following conditional expression is satisfied:

$350<HKG2N<600,$ where HKG2N represents a Knoop hardness of the one negative lens.

8. The optical system according to claim 1,
   wherein the third lens unit comprises, in order from the object side to the image side:
   a first sub-lens unit;
   a second sub-lens unit; and
   a third sub-lens unit,
   wherein the first sub-lens unit and the third sub-lens unit are configured not to move during focusing and correction of image blurring, and
   wherein the second sub-lens unit is configured to move in a direction containing a component in a direction perpendicular to the optical axis for correction of image blurring.

9. The optical system according to claim 1, wherein the optical system consists of the first lens unit, the second lens unit, and the third lens unit.

10. The optical system according to claim 9, wherein the third lens unit is configured not to move during focusing.

11. The optical system according to claim 1, wherein the aperture stop is arranged closest to the image side in the first lens unit.

12. An image pickup apparatus comprising:
    an optical system comprising, in order from an object side to an image side:
    a first lens unit having a positive refractive power;
    a second lens unit having a negative refractive power configured to move during focusing; and
    a third lens unit,
    wherein an interval between each pair of adjacent lens units is changed during focusing,
    wherein the first lens unit comprises a positive lens arranged closest to the object side and an aperture stop,
    wherein the second lens unit consists of one negative lens, and
    wherein the following conditional expressions are satisfied:

$LD/f<1.0;$ $1.58<ndG2N<1.80;$ $55<vdG2N<75;$ and $0.534<\theta gFG2N<0.560$ where LD represents a distance on an optical axis from a lens surface closest to the object side in the optical system to an image plane, f represents a focal length of the optical system, ndG2N represents a refractive index of a material of the one negative lens, vdG2N represents an Abbe number of the material of the one negative lens, and θgFG2N represents a partial dispersion ratio of the material of the one negative lens; and an image pickup element configured to receive an image formed by the optical system.

13. An optical system comprising, in order from an object side to an image side:
   a first lens unit having a positive refractive power;
   a second lens unit having a negative refractive power configured to move during focusing; and
   a third lens unit,
   wherein an interval between each pair of adjacent lens units is changed during focusing,
   wherein the first lens unit comprises a positive lens arranged closest to the object side, a plurality of negative lenses and an aperture stop,
   wherein the second lens unit consists of one negative lens, and
   wherein the following conditional expressions are satisfied:

$LD/f<1.0$;

$1.58<ndG2N<1.80$;

$55<vdG2N<75$; and $0.17<dG1PN/f<0.45$, where LD represents a distance on an optical axis from a lens surface closest to the object side in the optical system to an image plane, f represents a focal length of the optical system, ndG2N represents a refractive index of a material of the one negative lens, vdG2N represents an Abbe number of the material of the one negative lens, and dG1PN represents a distance on the optical axis between the positive lens and a negative lens located closest to the object side of the plurality of negative lenses included in the first lens unit.

14. An optical system comprising, in order from an object side to an image side:
   a first lens unit having a positive refractive power;
   a second lens unit having a negative refractive power configured to move during focusing; and
   a third lens unit,
   wherein an interval between each pair of adjacent lens units is changed during focusing,
   wherein the first lens unit comprises a positive lens arranged closest to the object side and an aperture stop,
   wherein the second lens unit consists of one negative lens, and
   wherein the following conditional expressions are satisfied:

$LD/f<1.0$;

$1.58<ndG2N<1.80$;

$55<vdG2N<75$; and $0.2<dF2/LD<0.5$, where LD represents a distance on an optical axis from a lens surface closest to the object side in the optical system to an image plane, f represents a focal length of the optical system, ndG2N represents a refractive index of a material of the one negative lens, vdG2N represents an Abbe number of the material of the one negative lens, and dF2 represents a distance on the optical axis from a lens surface on the image side of the one negative lens to the image plane.

15. The optical system according to claim 14, wherein the following conditional expression is satisfied:

$0.2<dF2/LD<0.48$.

16. An optical system comprising, in order from an object side to an image side:
   a first lens unit having a positive refractive power;
   a second lens unit having a negative refractive power configured to move during focusing; and
   a third lens unit,
   wherein an interval between each pair of adjacent lens units is changed during focusing,
   wherein the first lens unit comprises a positive lens arranged closest to the object side and an aperture stop arranged closest to the image side in the first lens unit,
   wherein the second lens unit consists of one negative lens, and
   wherein the following conditional expressions are satisfied:

$LD/f<1.0$;

$1.58<ndG2N<1.80$; and $55<vdG2N<75$, where LD represents a distance on an optical axis from a lens surface closest to the object side in the optical system to an image plane, f represents a focal length of the optical system, ndG2N represents a refractive index of a material of the one negative lens, and vdG2N represents an Abbe number of the material of the one negative lens.

* * * * *